United States Patent
Nishijima

(10) Patent No.: US 9,847,711 B2
(45) Date of Patent: Dec. 19, 2017

(54) SWITCHING POWER SUPPLY DEVICE CONTROL CIRCUIT AND SWITCHING POWER SUPPLY DEVICE

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-shi (JP)

(*) Notice: Subject to any disclaimer, the term of this patent is extended or adjusted under 35 U.S.C. 154(b) by 7 days.

(21) Appl. No.: 15/018,858

(22) Filed: Feb. 8, 2016

(65) Prior Publication Data

US 2016/0268901 A1   Sep. 15, 2016

(30) Foreign Application Priority Data

Mar. 13, 2015   (JP) .................................. 2015-051245

(51) Int. Cl.
*H02M 3/335*   (2006.01)
*H02M 1/44*   (2007.01)
*H02M 1/00*   (2006.01)

(52) U.S. Cl.
CPC ............. *H02M 1/44* (2013.01); *H02M 3/335* (2013.01); *H02M 3/33523* (2013.01); (Continued)

(58) Field of Classification Search
CPC ....... H03K 5/01; H03K 5/04; H02M 3/33538; H02M 3/33546; H02M 3/33515; (Continued)

(56) References Cited

U.S. PATENT DOCUMENTS 6,100,728 A   8/2000 Shreve et al.
2006/0244496 A1   11/2006 Kawakita
(Continued)

FOREIGN PATENT DOCUMENTS

EP   2682593 A2   1/2014
JP   2001157446 A   6/2001
(Continued)

OTHER PUBLICATIONS

Mario Paparo, "Controleur D'allumage De Carburant Completement Integre", Electronique industrielles, Societe des Editions Radio, Paris, France, No. 159, Apr. 1, 1989.

*Primary Examiner* — Timothy J Dole
*Assistant Examiner* — Bryan R Perez
(74) *Attorney, Agent, or Firm* — Rabin & Berdo, P.C.

(57) ABSTRACT

A switching power supply device enables measures against noise even when the conducted EMI standard is expanded to a low frequency region. A jitter control circuit, configured so as to reduce generation of conducted EMI noise by giving jitter (frequency diffusion) to a switching frequency which drives a switching element, upon receiving a feedback voltage representing the condition of a load, expands the diffusion width of the switching frequency in stages in accordance with a shift from a fixed frequency region of a maximum oscillation frequency, through a frequency reduction region, to a fixed frequency region of a minimum oscillation frequency. By so doing, it is possible to obtain the effect of sufficient reduction of EMI noise even when an EMI noise measurement frequency range is expanded to a low frequency side.

13 Claims, 15 Drawing Sheets

(52) U.S. Cl.
CPC ............... *H02M 2001/0032* (2013.01); *H02M 2001/0054* (2013.01); *Y02B 70/1491* (2013.01); *Y02B 70/16* (2013.01)

(58) Field of Classification Search
CPC ......... H02M 3/33576; H02M 3/33592; H02M 3/33553; H02M 3/33507; H02M 3/33523
USPC .................................................. 323/280–285
See application file for complete search history.

(56) References Cited

U.S. PATENT DOCUMENTS

| | | |
|---|---|---|
| 2011/0134581 A1 | 6/2011 | Godo et al. |
| 2012/0320632 A1* | 12/2012 | Kalodka ........... H02M 3/33507 363/16 |
| 2014/0301118 A1 | 10/2014 | Yabuzaki |
| 2015/0041849 A1 | 2/2015 | Gillberg et al. |
| 2015/0084533 A1 | 3/2015 | Naito |
| 2016/0020699 A1* | 1/2016 | Shen ................. H02M 3/33507 363/15 |

FOREIGN PATENT DOCUMENTS

| | | |
|---|---|---|
| JP | 2008-005682 A | 1/2008 |
| JP | 2014204544 A | 10/2014 |
| WO | WO 2013-038665 A1 | 3/2013 |
| WO | WO 2014-034895 A1 | 3/2014 |

* cited by examiner

FIG. 2

| SWITCHING FREQUENCY | 2Δf | 2Δf/RBW | ATTENUATION (CALCULATED VALUE) |
|---|---|---|---|
| 25kHz OPERATION | 10.5kHz (±21%) | 52.5 | >17dB |
| 35kHz OPERATION | 12.25kHz (±17.5%) | 61.25 | >17dB |
| 50kHz OPERATION | 14kHz (±14%) | 70 | >17dB |
| 65kHz OPERATION | 9.1kHz (±7%) | 45.5 | 16dB |

$\text{ATTENUATION}_{(dB)} = 10\log(2\Delta f/RBW)$, f<150kHz, RBW=200Hz

FIG. 12A
RELATED ART
FIG. 12B
RELATED ART
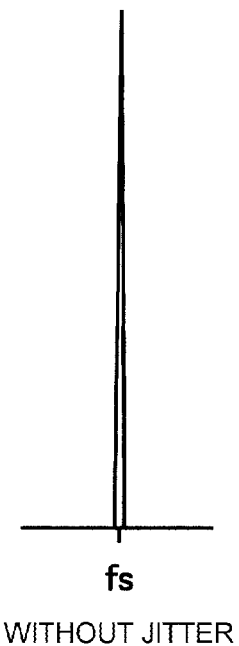
fs
WITHOUT JITTER
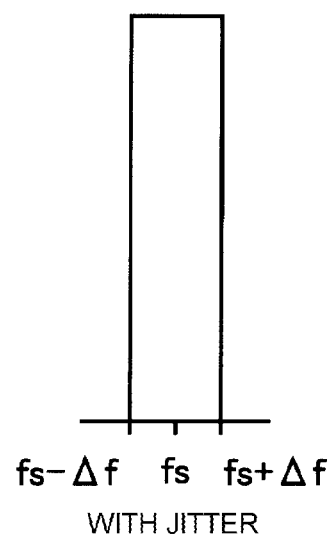
fs−Δf   fs   fs+Δf
WITH JITTER

SWITCHING POWER SUPPLY DEVICE CONTROL CIRCUIT AND SWITCHING POWER SUPPLY DEVICE

CROSS-REFERENCE TO RELATED APPLICATION

This application is based on, and claims priority to, Japanese Patent Application No. 2015-051245, filed on Mar. 13, 2015, contents of which are incorporated herein by reference.

BACKGROUND OF THE INVENTION

1. Field of the Invention

The present invention relates to a switching power supply device control circuit and a switching power supply device, and in particular to a switching power supply device control circuit, and a switching power supply device, wherein noise generation is reduced by giving jitter (frequency diffusion) to a switching frequency.

2. Description of the Background Art

A switching power supply device can convert a commercial alternating current voltage to an optional direct current voltage and output the direct current voltage, has a lower number of parts, and can also respond to a wide input voltage range. For example, a flyback type whose output voltage is isolated from a commercial power source is known.

FIG. 10 is a circuit diagram showing a typical configuration example of a flyback type switching power supply device.

The flyback type switching power supply device 100 has a control IC 8 which is a control circuit for pulse width modulation (PWM) control, and includes at least a transformer T, a diode 19, a capacitor 20, and a switching element, which are in FIG. 10. As the switching element, a metal oxide semiconductor field effect transistor (MOSFET) 17 is used here.

A commercial alternating current power source 1 is supplied to a diode bridge 4, via a common mode choke coil 2 and X capacitor 3 which configure an input noise filter, and is full-wave rectified by the diode bridge 4.

A capacitor 5, provided between the diode bridge 4 and the ground, has the function of holding the input voltage for stably supplying energy to the output and the function of absorbing switching noise generated due to the switching operation by the MOSFET 17. Also, a diode 6 half-wave rectifies and supplies the alternating current power source 1 to the VH terminal of the control IC 8 via a current limiting resistance 7. An input current to the VH terminal is limited by the current limiting resistance 7.

A thermistor 9 is connected to the LAT terminal of the control IC 8, thus providing overheat latch protection to the control IC 8. Also, the voltage of a sense resistance 12 is input into the CS terminal of the control IC 8 via a noise filter formed of a capacitor 10 and resistance 11.

The VCC terminal of the control IC 8 is connected to one end of a capacitor 13 and connected to an auxiliary winding 15 of the transformer T via a diode 14. The capacitor 13 holds a power supply voltage supplied to the control IC 8 when the PWM control is in operation. Also, the diode 14 is for supplying the voltage to the VCC terminal from the auxiliary winding 15 after a start.

One end of a primary winding 16 of the transformer T is connected to the capacitor 5, and the other end is connected to the drain terminal of the MOSFET 17. Also, the source terminal of the MOSFET 17 is grounded via the sense resistance 12, and a drain current Ids flowing through the MOSFET 17 is detected by the sense resistance 12. That is, the on-current of the MOSFET 17 is converted in the sense resistance 12 to a voltage signal proportional to the on-current, and the voltage signal (a current detection signal) is input into the CS terminal of the control IC 8 via the noise filter.

One end of a secondary winding 18 of the transformer T is connected to the diode 19, and furthermore, is grounded via the capacitor 20. The voltage of the capacitor 20 is an output voltage supplied to a load 25, and information on the voltage is sent from the secondary side to the primary side by a photo coupler 21. The photo coupler 21 is connected in series to a shunt regulator 22, the connection point of resistances 23 and 24 which divide the output voltage is connected to the shunt regulator 22, and the divided voltage value of the output voltage and an unshown reference voltage are compared by the shunt regulator 22. As a result of this, error information of the secondary side output voltage relative to the reference voltage is converted to a current signal by the shunt regulator 22, the current signal flows to an LED configuring the photo coupler 21 and is converted to an optical signal, the optical signal is transmitted to a phototransistor configuring the photo coupler 21, and load information is sent to the primary side.

In the switching power supply device 100 configured using the control IC 8 for PWM control, the voltage to which the alternating current input voltage is rectified is converted to a predetermined direct current voltage via the transformer T by controlling the switching operation of the MOSFET 17.

In the control IC 8 configured of an IC circuit, the load information output to the load 25 on the secondary side of the transformer T is detected by being fed back to the FB terminal of the control IC 8 via the shunt regulator 22 and photo coupler 21, as heretofore described.

Also, the drain current Ids of the MOSFET 17 is converted to a voltage by the sense resistance 12, and the voltage is detected at the CS terminal of the control IC 8. By determining the output signal from the OUT terminal by comparing an FB terminal voltage with a CS terminal voltage directly or indirectly, it is possible to PWM control a switching power source by variably controlling the on-width of the MOSFET 17, and thereby possible to adjust the power supplied to the secondary side load 25.

FIG. 11 is a block diagram showing a circuit configuration example of the control IC.

In the control IC 8, a start circuit 31 supplies a current to the VCC terminal from the VH terminal when starting, and when the alternating current power source 1 is applied, a current flows from the VH terminal through the start circuit 31 to the VCC terminal, in the control IC 8. By so doing, the capacitor 13 externally connected to the VCC terminal is charged, and the voltage value of the capacitor 13 rises.

A low voltage malfunction protection circuit (UVLO) 32 is connected to the VCC terminal and a reference power source V1. In the low voltage malfunction protection circuit 32, when the voltage value of the VCC terminal becomes equal to or more than the reference power source V1, a UVLO signal which is the output of the low voltage malfunction protection circuit 32 turns to Low (L) level, an internal power supply circuit 33 starts, and a power supply is carried out on each circuit in the control IC 8. On the other hand, while a VCC terminal voltage is low, the low voltage malfunction protection circuit 32 turns the UVLO signal to High (H) level and stops the operation of the control IC 8.

An oscillator (OSC) 34 is connected to the FB terminal, and a frequency modulation function which carries out frequency diffusion to reduce electromagnetic interference (EMI) noise generated in the switching operation of the MOSFET 17 is incorporated in the oscillator 34. The oscillator 34, which determines the switching frequency of the MOSFET 17 from the control IC 8, also has the function of lowering an oscillation frequency when under light load, apart from the frequency modulation function, and outputs an oscillation signal (a duty max signal) Dmax.

The oscillation signal Dmax being a signal whose H level time is long and which turns to L level for just a short time for each cycle, the cycle is the switching cycle of the switching power source, and the ratio of the cycle to the H level time in the cycle gives the maximum time ratio (duty max) of the switching power source. Also, a slope compensation circuit 35, connected to the CS terminal, includes the function of preventing subharmonic oscillation to be described hereafter.

The input terminal of an FB comparator 36 is connected to the FB terminal and a reference power source V2. When the FB terminal voltage drops below the reference power source V2, the FB comparator 36 determines that load power is small, and stops the switching operation by outputting a clear signal CLR to a one-shot circuit 37 at the stage subsequent to the FB comparator 36. Also, when the FB terminal voltage is higher than the reference power source V2, the FB comparator 36 starts the switching operation. By so doing, the FB comparator 36 realizes a burst operation which temporarily stops the switching operation when under light load.

The one-shot circuit 37, by being triggered when the oscillation signal Dmax of the oscillator 34 rises, generates a set pulse to be supplied to an RS flip-flop 38 at the subsequent stage. Also, the set pulse is also a blanking signal which prevents the MOSFET 17 from turning off erroneously due to noise generated at the CS terminal when the MOSFET 17 turns on. The one-shot circuit 37, while the clear signal CLR of H level is being input thereinto, does not output the set pulse to be supplied to the RS flip-flop 38.

The RS flip-flop 38 generates a PWM signal in conjunction with an OR gate 39 and an AND gate 40. That is, the OR gate 39 generates a logical sum (OR) signal from two output signals, the output signal of the one-shot circuit 37 and the output signal of the RS flip-flop 38, which are input into the OR gate 39.

Basically, the output signal of the OR gate 39 is the PWM signal, but furthermore, the AND gate 40 determines the maximum duty of the PWM signal based on the oscillation signal Dmax of the oscillator 34.

The UVLO signal output from the low voltage malfunction protection circuit 32 is supplied to a drive circuit (OUTPUT) 42 via an OR gate 41, thus controlling whether or not to allow an operation of the drive circuit 42. The drive circuit 42 controls switching of the gate of the MOSFET 17 using a switch signal Sout output from the drive circuit 42 via the OUT terminal. That is, when the VCC terminal voltage is low and the UVLO signal is H level, the output of the drive circuit 42 is turned off (a signal which turns off the MOSFET 17 is output). On the other hand, when the VCC terminal voltage is high, the UVLO signal is L level and the output signal of a latch circuit 49 is L level, the drive circuit 42 controls switching of the gate of the MOSFET 17.

A level shift circuit 43 has the function of level shifting the FB terminal voltage to a voltage range in which the FB terminal voltage can be input into a CS comparator 44, and the output signal of the level shift circuit 43 is supplied to the inverting input terminal (−) of the CS comparator 44. The output signal of the slope compensation circuit 35 is supplied to the non-inverting input terminal (+) of the CS comparator 44. An internal power source voltage is connected to the FB terminal via a resistance R0, and the resistance R0 is the load resistance (pull-up resistance) of the phototransistor configuring the photo coupler 21. Therefore, the magnitude of an error signal wherein the difference between a voltage applied to the load 25 connected to the switching power supply device 100 and the reference voltage is amplified is detected from a drop in the voltage from the internal power supply circuit 33 due to the resistance R0. The error signal is a signal indicating that the larger the value of the magnitude of the error signal, the heavier the load.

In the CS comparator 44, the CS terminal voltage provided with slope compensation for preventing the subharmonic oscillation, to be described hereafter, is compared with the level shifted FB terminal voltage, thus determining the off-timing of the MOSFET 17.

Also, an OCP comparator 45 which determines the overcurrent detection level of the MOSFET 17 is connected to the CS terminal of the control IC 8. In the OCP comparator 45, the non-inverting input terminal (+) thereof is connected to the CS terminal, and the inverting input terminal (−) is connected to a reference power source V3, thus determining the overcurrent detection level of the MOSFET 17.

Further, an off-signal from the CS comparator 44 and an off-signal from the OCP comparator 45 after a delay time is adjusted by a delay time control circuit 50 are both supplied to the reset terminal of the RS flip-flop 38 via an OR gate 46.

A current is supplied to the thermistor 9 from a current source 47 via the LAT terminal. An LAT comparator 48, connected to the LAT terminal and a reference power source V4, when detecting that the voltage of the LAT terminal (that is, the voltage of the thermistor 9) has dropped below the voltage of the reference power source V4, determines that there is an overheat condition, and outputs a set signal to be supplied to the latch circuit 49.

The latch circuit 49, upon receiving the set signal of the LAT comparator 48, outputs a latch signal Latch of H level to the OR gate 41 and an OR gate 51. By so doing, the drive circuit 42 is turned off, and the start circuit 31 is turned on. Also, the UVLO signal of the low voltage malfunction protection circuit 32 is supplied to the reset terminal of the latch circuit 49, and when the potential of the VCC terminal drops, a latch condition is extinguished.

When the internal power supply circuit 33 starts and the power source is supplied to the internal circuits, a voltage is applied to the phototransistor configuring the photo coupler 21 via the resistance R0 and FB terminal, and the FB terminal voltage rises.

When the FB terminal voltage signal becomes equal to or more than a certain voltage value, the oscillation signal Dmax is output from the oscillator 34, and the set pulse to be supplied to the RS flip-flop 38 is output from the one-shot circuit 37 which is triggered when the oscillation signal Dmax rises.

The set pulse is input into the OR gate 39 together with the output signal of the RS flip-flop 38. Further, the output signal of the OR gate 39, passing through the AND gate 40 and drive circuit 42 as the PWM signal, is output from the OUT terminal to the gate terminal of the MOSFET 17, turns to the switch signal Sout, and drives the MOSFET 17.

By so doing, the MOSFET 17 turns on when the oscillation Dmax rises. The reason for adopting the logical sum of the output signal of the RS flip-flop 38 and the set pulse from the one-shot circuit 37 is to prevent the RS flip-flop 38 from being reset due to noise generated at the CS terminal when the MOSFET 17 turns on and from turning off immediately after the MOSFET 17 turns on.

As the drain current Ids flows through the sense resistance 12 when the MOSFET 17 turns on, the voltage of the CS terminal of the control IC 8 rises. Further, when the voltage of the CS terminal, which is slope compensated by the slope compensation circuit 35 of the control IC 8, reaches a voltage to which the FB terminal voltage is level shifted by the level shift circuit 43, a reset signal is output from the CS comparator 44 to the RS flip-flop 38 via the OR gate 46.

As the output of the OR gate 39 turns to L level by the RS flip-flop 38 being reset (in normal operation, the set pulse from the one-shot circuit 37 is L level at this point), as a result of which the output of the AND gate 40 also turns to L level, and the MOSFET 17 turns off in response to the switch signal Sout.

Also, even though the load 25 connected to the switching power supply device is extremely heavy, and a voltage value fed back to the FB terminal of the control IC 8 falls out of a (high voltage side) control range, the voltage value of the CS terminal is compared with the reference power source V3 by the OCP comparator 45, and when the result is that the voltage value of the CS terminal is equal to or more than the reference power source V3, it is possible to turn off the MOSFET 17.

Before the voltage to which the FB terminal voltage is level shifted is compared with the CS terminal voltage by the CS comparator 44, the slope compensation wherein a slope compensation voltage proportional to the on-width of the MOSFET 17 is added to the CS terminal voltage by the slope compensation circuit 35 is performed on the CS terminal voltage.

In general, in the event that the MOSFET 17 is operating in steady state, the magnitude of the current flowing through the MOSFET 17 at the beginning of each switching cycle is constant. However, when the duty (an on-time ratio=the on-width/the switching cycle) of the MOSFET 17 is too large, the magnitude of the current is no longer constant, and the condition of the current flowing through the MOSFET 17 changes for each switching cycle. When this phenomenon occurs, the current flowing through the MOSFET 17 comes into a condition in which a switching frequency signal is superimposed on a low frequency signal.

Oscillation at this kind of low frequency is known as subharmonic oscillation, but the subharmonic oscillation has a condition under which the subharmonic oscillation occurs. The subharmonic oscillation can be prevented in such a way that the condition is prevented from being met by slope compensation wherein a monotonically increasing signal is superimposed on the CS terminal voltage.

Herein, in the switching power supply device 100, the oscillator 34 of the control IC 8 generates the oscillation signal Dmax for causing the switching operation of the MOSFET 17, and typically, 65 kHz, 25 kHz, and a frequency between these frequencies are used. That is, when the load 25 is a heavy load, the switching frequency operates fixed at 65 kHz, and the frequency is varied from 65 kHz to 25 kHz as the load 25 becomes lighter. When the frequency drops to 25 kHz, the frequency is fixed at 25 kHz, thus preventing the frequency from dropping to an audio frequency which causes a sounding of the transformer T. In this way, an operation frequency is reduced as the load becomes lighter, thereby enabling an increase in the efficiency of the switching power supply device 100.

Herein, when the switching frequency is fixed at, for example, 65 kHz, a high order harmonic with 65 kHz as a fundamental wave is generated at the same time, the high order harmonic is emitted to the outside of the switching power supply device 100 as radiated EMI and conducted EMI. As this kind of EMI noise affects the operation of other electronics, the reference of a required limit is set in order not to generate a certain amount or more of EMI noise. Hereafter, a discussion will be given of conducted EMI noise.

In the field of power electronics such as the switching power supply device 100, jitter (frequency diffusion) is used as a method of reducing conducted EMI noise (for example, refer to JP-A-2014-204544).

FIGS. 12A and 12B are diagrams showing a difference in noise energy between the existence and non-existence of jitter, wherein the horizontal axis indicates the frequency, and the vertical axis indicates the noise energy. Also, FIG. 12A shows a case in which there is no jitter, and FIG. 12B shows a case in which there is jitter. FIG. 12B shows the case of center diffusion wherein the frequency is diffused in a range of ±Δf centered on a frequency fs with no jitter.

In the case of no jitter, noise energy concentrates in the position at the frequency fs, exhibiting a high peak, but the noise energy disperses by diffusing the frequency in the range of ±Δf centered on the frequency fs, and the average value of the noise energy decreases. Therefore, even though the peak exceeds the required limit when there is no jitter, the peak can be set to equal to or less than the required limit when there is jitter.

FIG. 13 is a diagram showing a noise level attenuation effect when the switching frequency is diffused. In FIG. 13, the horizontal axis indicates the diffusion width, while the vertical axis indicates the attenuation, and noise attenuation when the frequency fs of the fundamental wave is 65 kHz and a resolution bandwidth RBW which is a measurement frequency width is 9 kHz, is shown.

According to FIG. 13, attenuation S shows that the wider the diffusion width, the larger the attenuation S, and the greater the noise level attenuation effect. Also, the attenuation S at this time can be expressed by the following equation (for example, refer to JP-A-2008-5682 (Mathematical 2)).

$$S=10\times\log(2\times\delta\times fs/RBW)=10\times\log(2\Delta f/RBW)$$

Herein, δ is a diffusion rate (%), fs is an operation frequency (Hz), Δf is a one-sided diffusion width (=fs×δ) (Hz), and RBW is a resolution bandwidth (Hz). According to the equation of the attenuation S, it is represented that the larger the ratio of the diffusion width (2Δf) to the resolution bandwidth RBW, the greater the attenuation effect.

In the meantime, as the measurement frequency range of EMI noise is defined, in the existing standard of conducted EMI, as being from 150 kHz to 30 MHz, there is a need to take a harmonic of 150 kHz or more into account as for the attenuation effect. According to FIG. 13, in order to obtain an attenuation of 3 dB or more, it is necessary to secure 20 kHz or more as the diffusion width (2Δf). Herein, a description will be given of a case in which the diffusion width is fixed at a certain rate (herein, ±7%) with respect to the fundamental switching operation frequencies fs of 65 kHz and 25 kHz. That is, the switching power supply device 100 operates at 65 kHz±4.55 kHz when under heavy load, and operates at 25 kHz±1.75 kHz when under light load.

As an order n=3 applies to the harmonic of 150 kHz or more at 65 kHz±4.55 kHz, the third order harmonic frequency is 3×(65 kHz±4.55 kHz)=195 kHz±13.65 kHz, and the diffusion width is 27.3 kHz. As the harmonic is such that the higher the order, the smaller the energy, it is not necessary to take into account the attenuation of a fourth or higher order harmonic in the event that the third order harmonic is below the EMI limit.

As an order n=6 applies to the harmonic of 150 kHz or more at 25 kHz±1.75 kHz, the sixth order harmonic frequency is 6×(25 kHz±1.75 kHz)=150 kHz±10.5 kHz, and the diffusion width is 21 kHz.

Therefore, by setting the diffusion width at ±7% with respect to the switching operation frequencies fs of 65 kHz and 25 kHz, it is possible to secure a diffusion width of 25 kHz or more in the measurement frequency range of EMI noise, and thus possible to obtain an attenuation of 3 dB or more.

FIG. 14 is a circuit diagram showing a configuration example of an oscillator having a jitter control circuit which carries out frequency diffusion, and FIG. 15 is a circuit diagram showing a configuration example of the jitter control circuit.

The oscillator 34 includes a buffer amplifier 61, which detects the feedback voltage FB, and an amplifier 62, which controls a current flowing through a transistor (an n-channel MOS-FET) N1 in response to the output of the buffer amplifier 61, as shown in FIG. 14. The transistor N1 is connected to a current mirror circuit formed of transistors (n-channel MOS-FETs) P1 and P2, and the current flowing through the transistor N1 is the input current of the current mirror circuit. The output current of the current mirror circuit is given to a transistor N2 connected to the drain terminal of the transistor P2 which is the output terminal of the current mirror circuit, and is used to control a current flowing through a transistor N5. Furthermore, the output current of the current mirror circuit is used to control a current flowing through a transistor P4 via a transistor N3 and transistor P3.

The transistors P4 and N5 are connected in series via transistors P5 and N4 which are complementarily controlled on/off. Further, a capacitor C is connected to the series connection point of the transistors P5 and N4. The transistor P5 assumes the role of charging the capacitor C with the current flowing through the transistor P4 when the transistor P5 is in on-operation. Also, the transistor N4 assumes the role of charging the capacitor C with the current flowing through the transistor N5 when the transistor N4 is in on-operation.

A hysteresis comparator 63 compares the charge/discharge voltage of the capacitor C and a predetermined reference voltage Vref (which is actually formed of two reference voltages, a high side reference voltage VrefH and a low side reference voltage VrefL, because of a hysteresis comparator), and an inverter 64 inverts the output of the hysteresis comparator 63 and generates the oscillation signal Dmax for driving the MOSFET 17 on/off. Also, at the same time, the output of the hysteresis comparator 63 is used as a control signal which complementarily drives the transistors P5 and N4 on/off and a clock signal which defines the operation of a jitter control circuit 70.

The jitter control circuit 70 includes a plurality (four) of transistors P11, P12, P13, and P14, which form current mirror circuits in parallel with the transistor P1, and transistors P15, P16, P17, and P18, which are connected in series with the respective transistors P11, P12, P13, and P14, as shown in FIG. 15. The transistors P15, P16, P17, and P18 assume the role of, by being controlled on/off upon receiving outputs Q0, Q1, Q2, and Q3 of a frequency divider and counter 71, selectively extracting currents flowing through the transistors P11, P12, P13, and P14, and applying the current to the drain current of the transistor N2.

The respective currents flowing through the transistors P11, P12, P13, and P14 are set as, for example, 11, 12 (=2·I1), 13 (=2·I2=4·I1), 14 (=2·I3=4·I2=8·I1). These current ratios are set by changing the gate width/gate length of the transistors P11, P12, P13, and P14 forming the respective current mirror circuits with the transistor P1.

Incidentally, the frequency divider and counter 71 divides the output of the hysteresis comparator 63 and performs a counting operation. Further, the frequency divider and counter 71 counts the number resulting from the counting operation and changes the outputs Q0, Q1, Q2, and Q3 in order in, for example, a range of [0000] to [1111]. By so doing, the transistors P15, P16, P17, and P18 are selectively controlled on/off. Further, the currents flowing through the transistors P11, P12, P13, and P14 are selectively output by a selective on-operation of the transistors P15, P16, P17, and P18.

As a result of this, an output current b of the jitter control circuit 70 changes step by step, and the output current b is applied to the transistor N2. Further, a step-by-step change is given to a current which charges the capacitor C, and a cyclic change is given to a time for which the capacitor C is charged to the reference voltage Vref. As a result of this, cyclic fluctuations with a certain width are given to the frequency of a pulse signal output via the hysteresis comparator 63. This kind of oscillation frequency control is jitter control of the switching frequency which drives the MOS-FET 17. Further, EMI noise generated as a result of switching of the MOSFET 17 is diffused in frequency by the jitter control, thereby reducing the EMI noise.

In the meantime, it is under consideration that the existing conducted EMI standard (the measurement frequency range exceeds 150 kHz) is defined so as to expand the EMI noise measurement frequency range to a low frequency of 150 kHz or less and thus prevent conducted EMI noise from being generated even in a lower measurement frequency range. When the measurement frequency range expands, the switching operation frequency, that is, the frequency of a fundamental wave having largest noise energy falls in the measurement frequency range, and it is necessary to take measures against noise from the fundamental wave of the switching frequency (for example, 65 kHz). When attempting to suppress this with an EMI filter, there is the problem of the possibility that the constants of the inductor and capacitor become larger due to the low frequency, as a result of which the size of parts increases, and that the size of the switching power supply device increases and, eventually, the cost increases.

SUMMARY OF THE INVENTION

The invention, having been contrived bearing in mind these kinds of points, has for its object to provide a switching power supply device control circuit, and a switching power supply device, which can take measures against noise even in a low frequency region expanded by a revision of the conducted EMI standard in the field of power electronics.

In the invention, in order to achieve the object, a switching power supply device control circuit which, when controlling so as to generate a predetermined direct current voltage by switching a switching element connected to an input voltage and output the direct current voltage to a load, controls so as to reduce a switching frequency as the load shifts from a heavy load to a light load, is provided. The switching power supply device control circuit includes an oscillator which determines the switching frequency corresponding to the condition of the load by switching a predetermined current corresponding to the condition of the load between charging and discharging a capacitor; and a jitter controller, provided in the oscillator, which gives frequency diffusion to the switching frequency, wherein the jitter controller controls so as to expand the diffusion width of the switching frequency as the load shifts from a heavy load to a light load.

In the invention, a switching power supply device including a control circuit which, when controlling so as to generate a predetermined direct current voltage by switching a switching element connected to an input voltage and output the direct current voltage to a load, controls so as to reduce a switching frequency as the load shifts from a heavy load to a light load, is provided. According to the switching power supply device, the control circuit includes an oscillator which determines the switching frequency corresponding to the condition of the load by switching a predetermined current corresponding to the condition of the load between charging and discharging a capacitor; and a jitter controller, provided in the oscillator, which gives frequency diffusion to the switching frequency, wherein the jitter controller controls so as to expand the diffusion width of the switching frequency as the load shifts from a heavy load to a light load.

The switching power supply device control circuit and switching power supply device of the heretofore described configuration control so as to expand the frequency diffusion, which is given to the whole range of the switching frequency which is variably controlled, as the load shifts from a heavy load to a light load. Therefore, there is the advantage that it is possible to reduce noise resulting from a minimum oscillation frequency, in particular, even when the measurement frequency range of EMI noise is expanded to a low frequency.

BRIEF DESCRIPTION OF THE DRAWINGS

FIG. 2 is a diagram showing a noise reduction effect.

FIGS. 12A and 12B are diagrams showing a difference in noise energy between the existence and non-existence of jitter, wherein FIG. 12A shows a case in which there is no jitter, and FIG. 12B shows a case in which there is jitter.

DETAILED DESCRIPTION OF THE INVENTION

Figure 10:
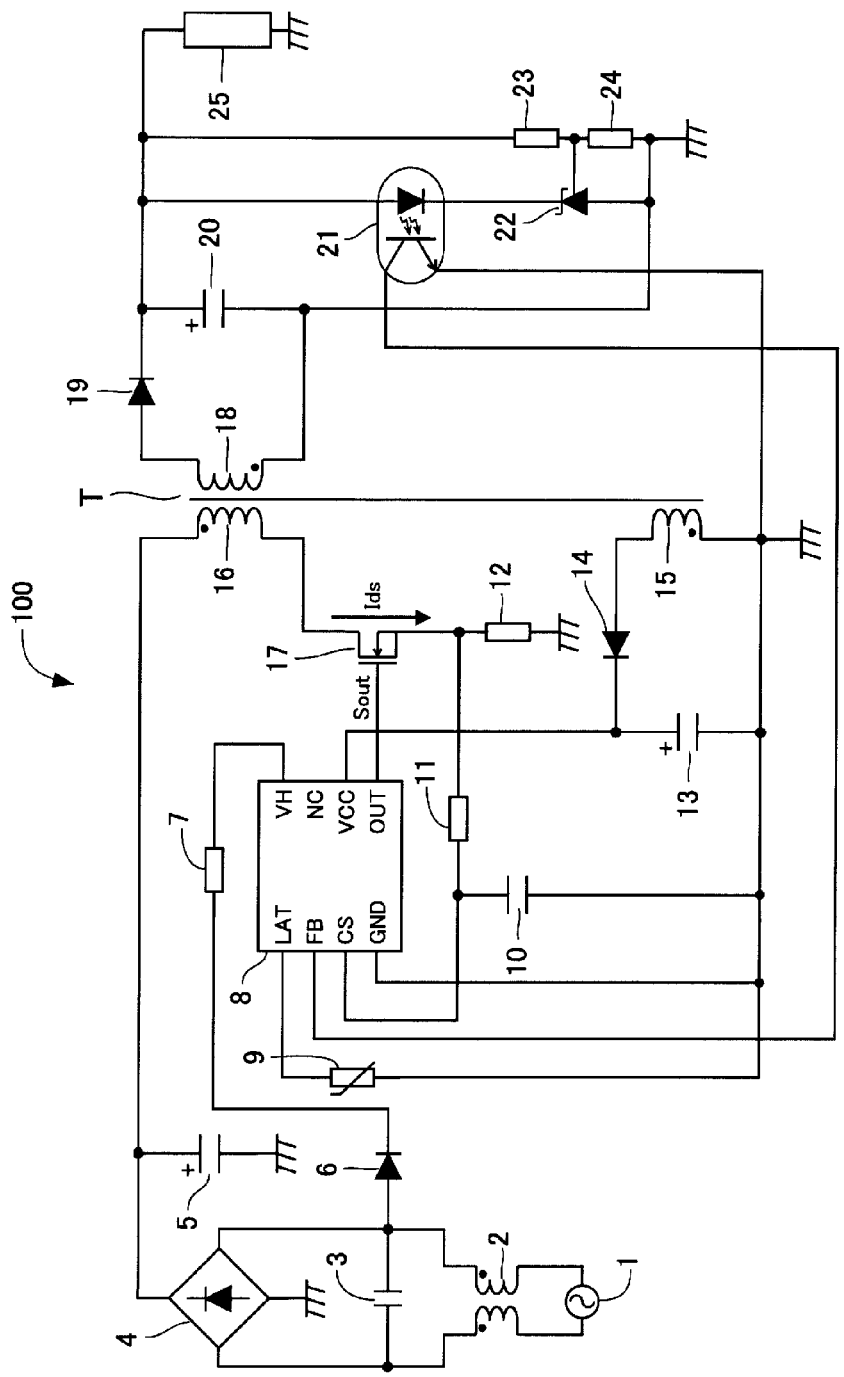
FIG. 10 is a circuit diagram showing a typical configuration example of a flyback type switching power supply device.
Figure 11:
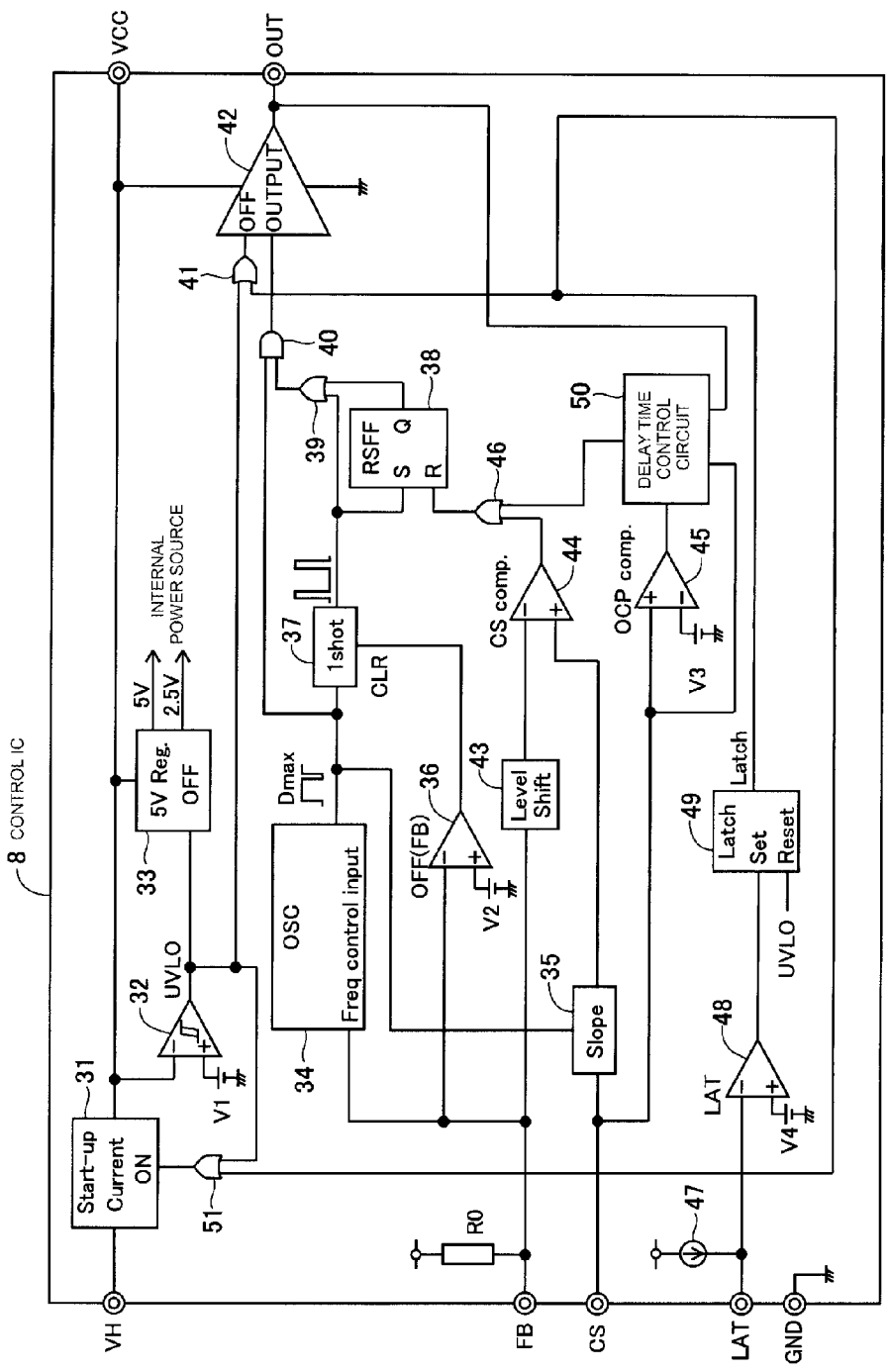
FIG. 11 is a block diagram showing a circuit configuration example of a control IC.
Figure 13:
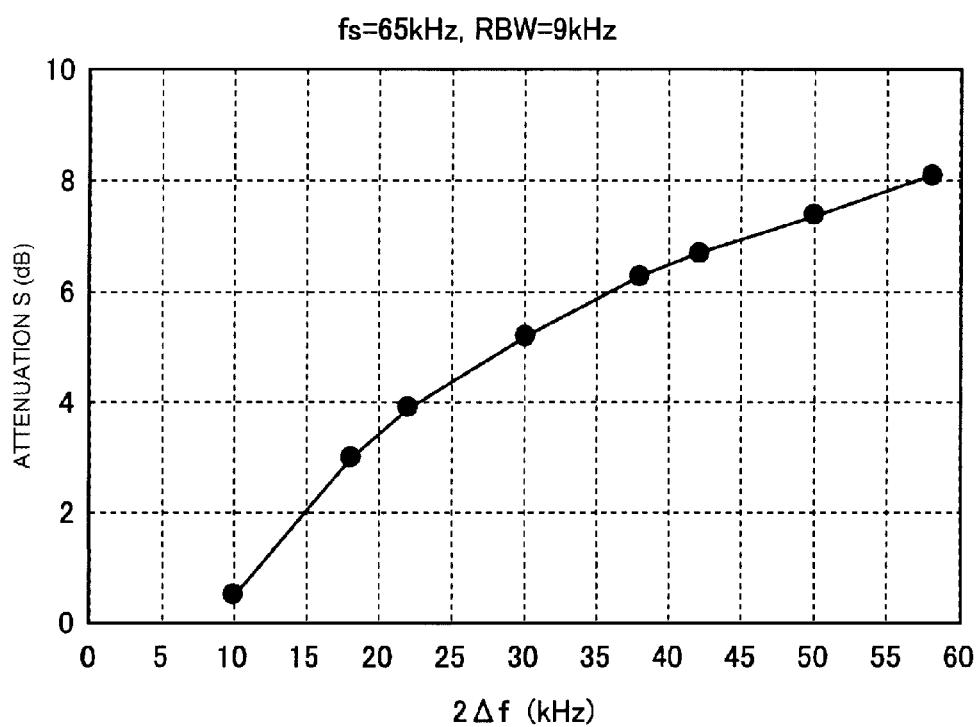
FIG. 13 is a diagram showing a noise level attenuation effect when a switching frequency is diffused.
Figure 14:
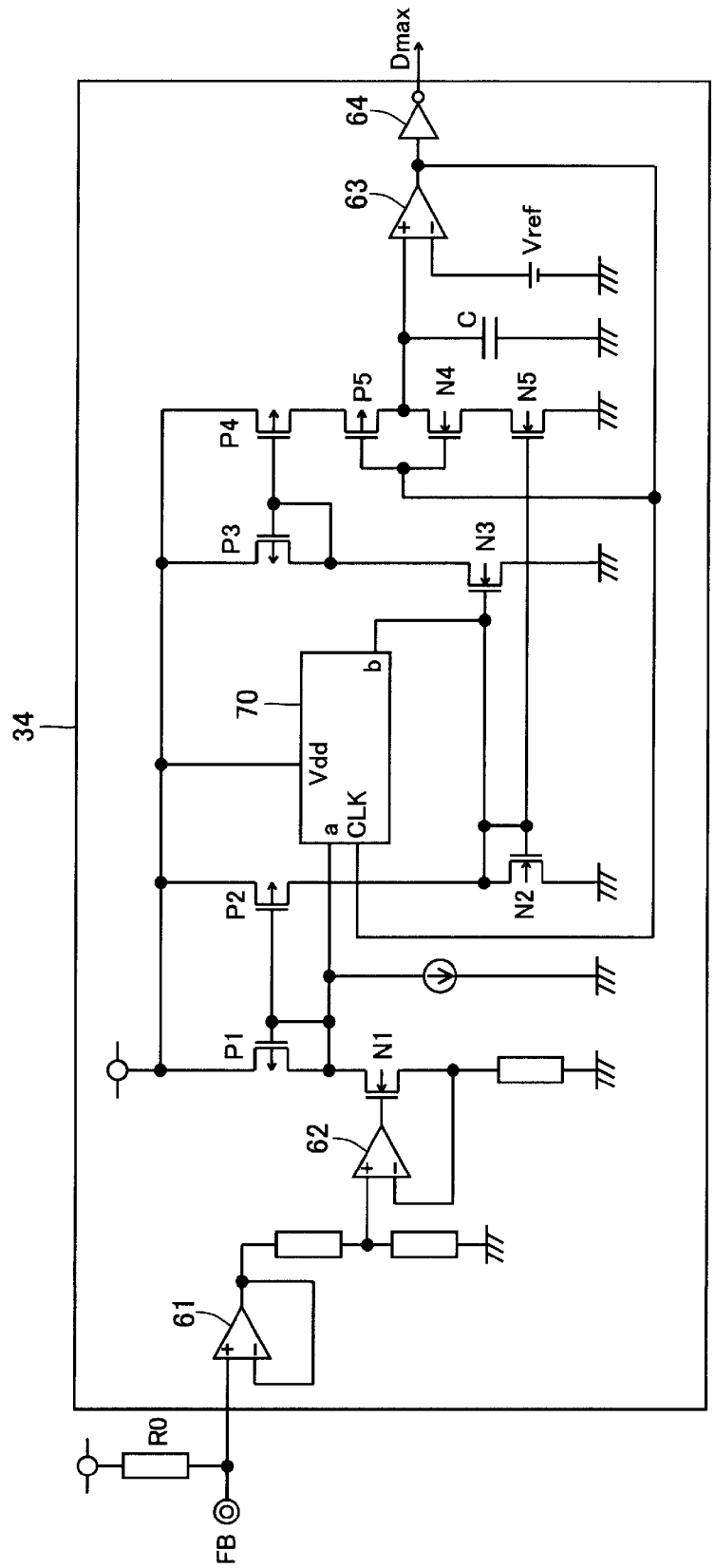
FIG. 14 is a circuit diagram showing a configuration example of an oscillator having a jitter control circuit which carries out frequency diffusion.
Figure 15:
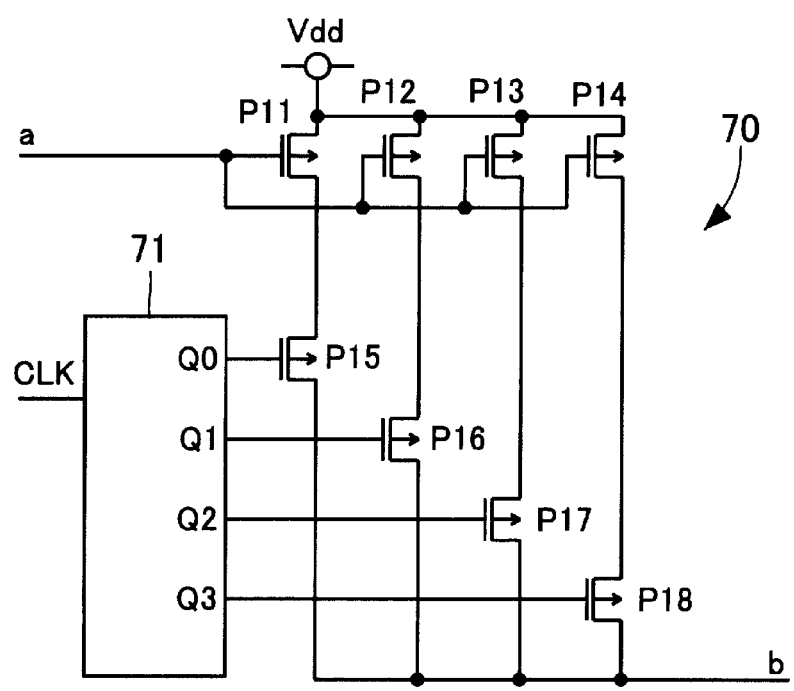
FIG. 15 is a circuit diagram showing a configuration example of the jitter control circuit.

Hereafter, a detailed description will be given, referring to the drawings, of embodiments of the invention. In the following description, as the overall configuration of a switching power supply device is the same as in FIG. 10 heretofore described, and the overall circuit configuration of a control IC is the same as in FIG. 11 heretofore described, the same reference signs will be used for corresponding components, referring to FIGS. 10 and 11, when describing the two circuit configurations. Also, in the following description, the same signs may be used for the names of terminals, the voltages at the terminals, signals, and the like.

Figure 1:
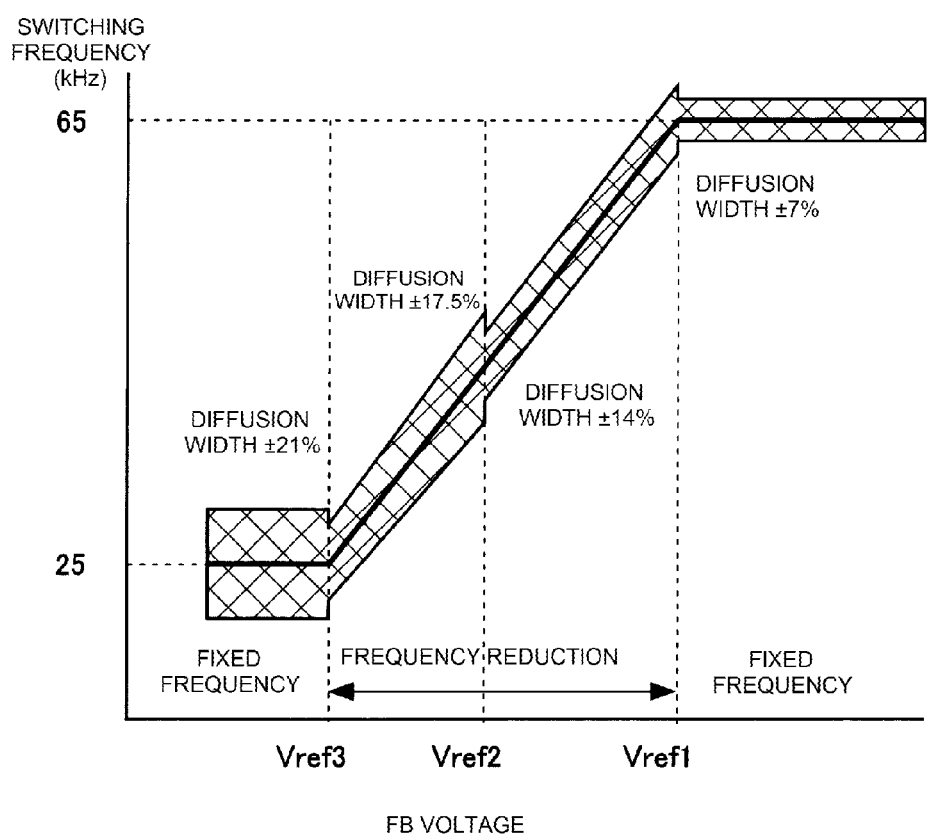
FIG. 1 is a diagram showing a concept of jitter control of the invention.

FIG. 1 is a diagram showing a concept of jitter control of the invention, and FIG. 2 is a diagram showing a noise reduction effect. In FIG. 1, the horizontal axis indicates a feedback (FB) voltage sent from the secondary side to the primary side of a transformer T by a photo coupler 21, and the vertical axis indicates a switching frequency of a MOSFET 17 which is the oscillation frequency of an oscillator 34 of a control IC 8.

The control IC 8 of a switching power supply device 100 includes a function wherein the oscillator 34 changes the switching frequency in response to a feedback voltage corresponding to the condition of a load (the heavier the load, the larger the feedback voltage). Specifically, the oscillator 34 drives the MOSFET 17 at a maximum oscillation frequency (e.g., a fixed frequency region of 65 kHz) when under a load whose feedback voltage is a first value (Vref1) or more. When the feedback voltage is the first value or less, the oscillator 34 lowers the switching frequency as the load decreases, thus improving the efficiency (a frequency reduction region). Furthermore, when it comes to alight load whose feedback voltage is a third value (Vref3) or less, the oscillator 34 drives the MOSFET 17 at a minimum oscillation frequency (e.g., a fixed frequency region of 25 kHz).

Meanwhile, the oscillator 34 also causes a jitter control circuit thereof to diffuse the switching frequency. Herein, the diffusion width of the switching frequency diffused by the jitter control circuit is set at, e.g., ±7% in the fixed frequency region of, e.g., 65 kHz (in a range in which the FB voltage is Vref1 or more), as shown in FIG. 1. The diffusion width in the frequency reduction region is set at, e.g., ±14% on a side close to the fixed frequency region of 65 kHz (in a range in which the FB voltage is Vref1 to Vref2), and is set at, e.g., ±17.5% on a side close to the fixed frequency region of, e.g., 25 kHz (in a range in which the FB voltage is Vref2 to Vref3). Further, the diffusion width in the fixed frequency region of 25 kHz (in a range in which the FB voltage is Vref3 or less) is set at, e.g., ±21%.

That is, a configuration is such that the diffusion width of the switching frequency increases in stages as the feedback voltage FB shifts from a high (heavy load) region to a low (light load) region. Moreover, as a resolution bandwidth RBW is, e.g., 200 Hz in a range (e.g., ≤150 kHz) wherein a measurement frequency range is expanded, the ratio of the diffusion width (e.g., 2Δf) to the resolution bandwidth RBW increases (RBW is 9 kHz in the existing standard that the measurement frequency >150 kHz). Therefore, by effectively utilizing the increase of (2Δf/RBW) in the heretofore described equation of attenuation S, it is possible to enhance an EMI noise reduction effect by carrying out optimum control.

The noise reduction effect produced by increasing the diffusion width as the switching frequency shifts from 65 kHz to 25 kHz is as shown in FIG. 2. That is, it can be seen that when the switching frequency is 65 kHz, the attenuation is a calculated value of 16 dB, and that when the switching frequency is lower than 65 kHz, the attenuation is a calculated value of 17 dB or more in any operation. Calculations are made with the resolution bandwidth RBW in a measurement frequency range of 9 kHz to 150 kHz as 200 Hz.

First Embodiment

Figure 3:
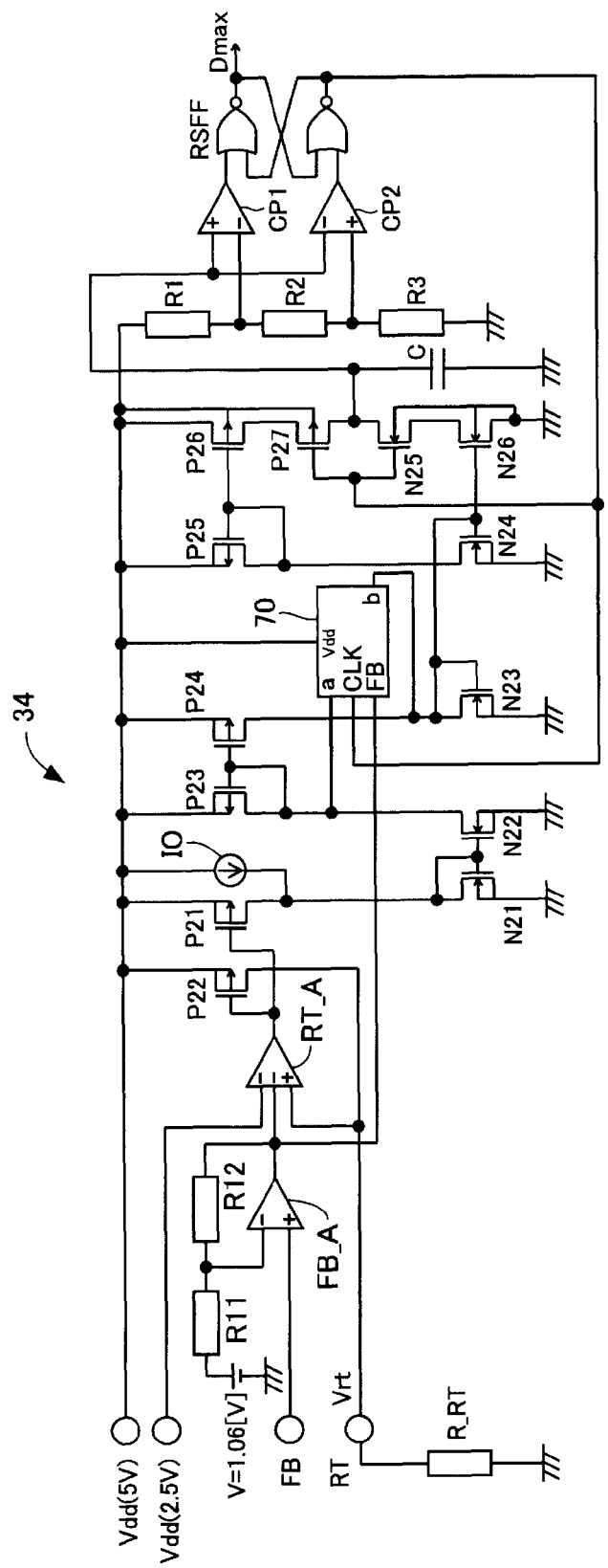
FIG. 3 is a diagram showing an outline configuration of an oscillator provided in a control IC of a switching power supply device according to a first embodiment.
Figure 4:
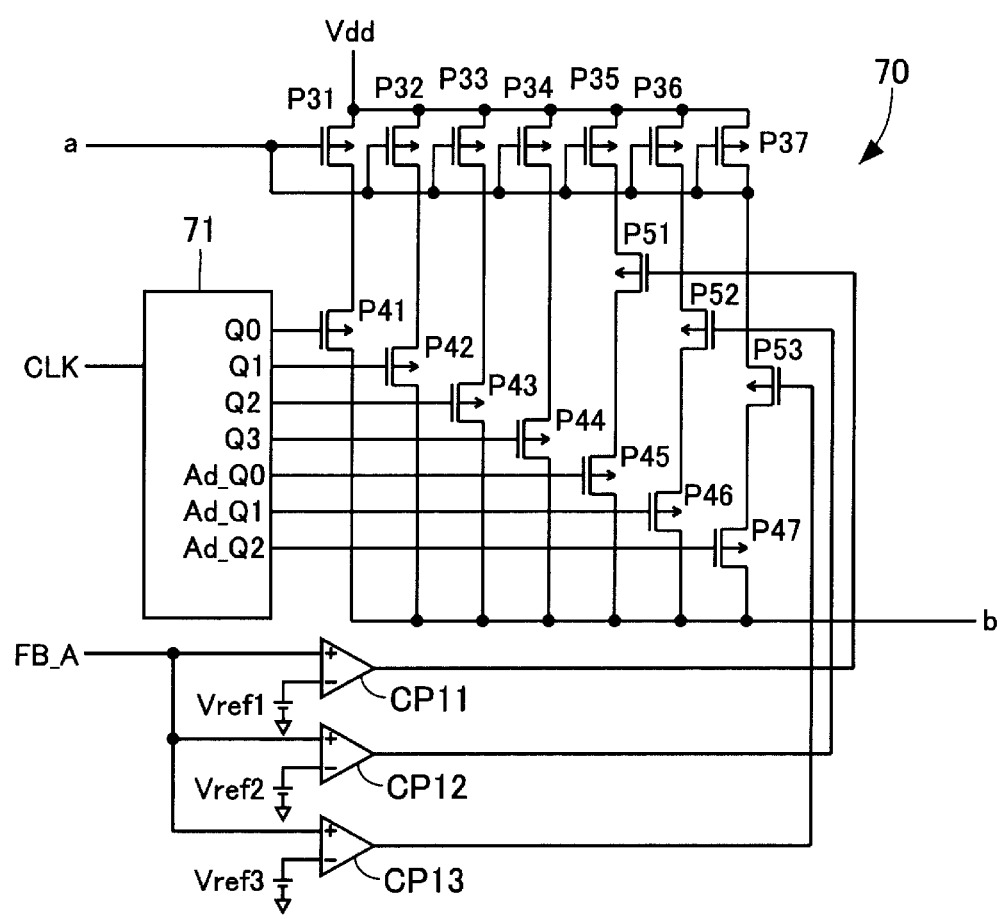
FIG. 4 is an outline configuration of a jitter control circuit provided in the oscillator of FIG. 3.

FIG. 3 is a diagram showing an outline configuration of an oscillator provided in a control IC of a switching power supply device according to a first embodiment, and FIG. 4 is a diagram showing an outline configuration of a jitter control circuit provided in the oscillator of FIG. 3.

The oscillator 34 has terminals Vdd (e.g., 2.5V) and Vdd (e.g., 5V), which receive voltages output from an internal power supply circuit 33, a feedback terminal FB, which receives a feedback voltage equivalent to an error signal wherein the weight of a load is converted to a voltage, and a timing resistance connection terminal RT, as shown in FIG. 3. A timing resistance R_RT, which is an external part of the control IC 8, is connected to the timing resistance connection terminal RT.

The feedback terminal FB is connected to an amplifier FB_A. The output voltage of the amplifier FB_A being, e.g., (FB+(FB−1.06V)×R12/R11), an amplification factor=R12/R11 is determined by resistances R11 and R12, and an amplifier with an amplification factor of, for example, 10 is configured. When the voltage FB of the feedback terminal FB is smaller than 1.06V, the output of the amplifier FB_A is smaller than FB, but as the low potential side supply voltage of the amplifier FB_A is a ground potential, the minimum output of the amplifier FB_A is zero.

A multi-input amplifier RT_A is an amplifier which outputs a lower one of the voltages of two inverting input terminals. For example, when under heavy load, the output of the multi-input amplifier RT_A is 2.5V when the feedback voltage FB is high and the output of the amplifier FB_A is equal to or more than 2.5V which is Vdd (2.5V).

Meanwhile, as a ten-time change in the amount of change in the feedback voltage FB is the output of the amplifier FB_A when under light load, the output of the multi-input amplifier RT_A is Vdd (2.5V) or less. Consequently, the output of the multi-input amplifier RT_A is equal to the output of the amplifier FB_A and is Vdd (2.5V) or less.

The output of the multi-input amplifier RT_A is connected to the gates of transistors P21 and P22. The set of transistors P22 and P21, a set of transistors N21 and N22, a set of transistors P23 and 24, a set of transistors N23, N24, and N26, and a set of transistors P25 and P26 each configure a current mirror circuit. The output current of the current mirror circuit formed of the transistors P22 and P21 is the input current of the current mirror circuit formed of the transistors N21 and N22, the output current of the current mirror circuit formed of the transistors N21 and N22 is the input current of the current mirror circuit formed of the transistors P23 and P24, the output current of the current mirror circuit formed of the transistors P23 and P24 is the input current of the current mirror circuit formed of the transistors N23, N24, and N26, and the output current (the drain current of the transistor N24) of the current mirror circuit formed of the transistors N23, N24, and N26 is the input current of the current mirror circuit formed of the transistors P25 and P26.

Also, the transistors P26 and N26 connected to the subsequent stages of the transistors P25 and N24 configure a current source, and the transistors P27 and N25 configure a switch which carries out switching between charge and discharge of a capacitor C. The gates of the transistors P27 and N25 configuring the switch are connected to a circuit formed of resistances R1, R2, and R3, which set the upper and lower limits of a triangular wave oscillation waveform, comparators CP1 and CP2, and an RS flip-flop RSFF. In this case, the previously described VrefH is VrefH=5×(R2+R3)/(R1+R2+R3), and the previously described VrefL is VrefL=5×R3/(R1+R2+R3). Also, an oscillation signal Dmax is output from the RS flip-flop RSFF. A constant current source TO is connected in parallel to the transistor P21, and a configuration is such that when the feedback voltage FB becomes smaller and the output of the amplifier FB_A reaches zero, there is no more charge or discharge of the capacitor C, thus preventing oscillation from stopping.

Also, the output of the multi-input amplifier RT_A, as the output is the input into the gate of the transistor P22, controls a current flowing through the timing resistance R_RT. At this time, a terminal voltage appearing at the timing resistance connection terminal RT is taken to be Vrt. As the multi-input amplifier RT_A is configured of an operational amplifier, the value of the voltage Vrt of the timing resistance connection terminal RT is the same voltage as a lower one of Vdd (2.5V) or the output voltage of the amplifier FB_A due to a short circuit between the input terminals of the operational amplifier. Consequently, a current flowing through the transistor P22=(the voltage Vrt/the resistance value of the timing resistance R_RT). Further, as the transistors P22 and P21 configure a current mirror circuit, a current flowing through the transistor P21 is equal to or proportional to the current flowing through the transistor P22.

The basic operation of the oscillator 34 when a jitter control circuit 70 to be described hereafter does not exist is as follows. That is, a current wherein the current flowing through the transistor P21 and the constant current source 10 are added is returned by a plurality of current mirror circuits, and a current equal to or proportional to the current obtained by the addition is generated in the transistors P25, P26, N24, and N26. Herein, the transistors P27 and N25 are switched by the voltage of the RS flip-flop RSFF, thus carrying out the switching between the charge and discharge of the capacitor C.

As the multi-input amplifier RT_A outputs a fixed value of Vdd (e.g., 2.5V) and controls Vrt so that Vrt=2.5V, by the above operation, when under a heavy load, the terminal voltage of the feedback terminal FB of which is high, the oscillation frequency is kept constant. Meanwhile, when the terminal voltage of the feedback terminal FB decreases and drops to 2.5V or less, the output of the amplifier FB_A changes linearly in response to the load level, and the output of the multi-input amplifier RT_A also changes in the same way. When the terminal voltage of the feedback terminal FB drops to 2.5V or less, a current which charges and discharges the capacitor C decreases, and as a result of this, the oscillation frequency drops. In this way, it is realized that when under light load, the output of the multi-input amplifier RT_A is changed with respect to the load in the heretofore described way, thereby lowering the oscillation frequency in response to the load.

The oscillator 34 further has the jitter control circuit 70 which gives fluctuations to a triangular wave oscillation waveform formed by the charge and discharge of the capacitor C by the basic operation. The jitter control circuit 70 includes a frequency divider and counter 71, transistors P31 to P37 connected in parallel, outputs Q0 to Q3 of the frequency divider and counter 71, and transistors P41 to P47 connected to Ad_Q0 to Ad_Q2 equivalent to high-order bits Q4 to Q6 of the frequency divider and counter 71, as shown in FIG. 4. The jitter control circuit 70 further includes comparators CP11 to CP13 and transistors P51 to P53 connected to the outputs of the comparators CP11 to CP13.

The transistors P41 to P47, whose drain terminals are connected in common, supply an output current b to the transistor N23 of FIG. 3. A current wherein the output current b is added to the current from the transistor P23 flows through the transistor N23. As a result of this, a current equal to or proportional to the current wherein the current of the transistor P23 and the output current bare added flows through the transistors P26 and N26. By so doing, the frequency diffusion of an oscillation frequency to which fluctuations are given by the output current b is performed. It is often the case that the current of the transistor N26>the current of the transistor P26 is achieved by changing the size of the transistors configuring the halfway current mirror.

The inverted signal of the oscillation signal Dmax is input into a clock terminal CLK of the frequency divider and counter 71, and the frequency divider and counter 71 carries out the operation of counting up each time a pulse of the inverted signal of the oscillation signal Dmax is input, returning to 0 when the maximum value is reached, and continuing to count up again.

The transistors P31 to P37, whose gates are connected to the gate of the transistor P23, configure current mirror circuits with the transistor P23. The transistors P31 to P37, not being the same in size, are configured so as to achieve the current of the transistor P31<the current of the transistor P32< . . . <the current of the transistor P36<the current of the transistor P37. The transistors P31 to P34 are connected in series to the transistors P41 to P44. The transistor P35 is connected in series to the transistors P51 and P45, the transistor P36 is connected in series to the transistors P52 and P46, and the transistor P37 is connected in series to the transistors P53 and P47.

The comparators CP11 to CP13 are such that the feedback voltage FB or the output of the amplifier FB_A which amplifies the feedback voltage FB is connected to the non-inverting inputs of the comparators CP11 to CP13 (FIG. 4 shows an example applying the output of the amplifier FB_A), while the reference voltages Vref1, Vref2, and Vref3 are input into the inverting inputs of the comparators CP11 to CP13. The reference voltages Vref1, Vref2, and Vref3 correspond respectively to an FB voltage, at which the switching frequency shifts from, e.g., 65 kHz to the frequency reduction region, an FB voltage, at which the switching frequency shifts from the frequency reduction region to, e.g., 25 kHz, and an FB voltage in the frequency reduction region, in FIG. 1.

Herein, the transistors P31 to P34 define the diffusion width (e.g., ±7%) when the switching frequency is fixed at, e.g., 65 kHz. The other diffusion widths (e.g., ±14%, ±17.5%, and ±21%) are defined by combining the transistors P35 to P37. Switching between the diffusion widths is carried out by the comparators CP11 to CP13 controlling the transistors P51 to P53 on/off in response to the feedback voltage FB.

That is, when Vref1<Vfb wherein the output voltage of the amplifier FB_A is taken to be Vfb, the outputs of all the comparators CP11 to CP13 are H level, and the transistors P51 to P53 are controlled off. Herein, the control by the frequency divider and counter 71 enables the output current b to be of a value equivalent to the diffusion width (e.g., ±7%) defined by the transistors P31 to P34.

When Vref2<Vfb<Vref1, the output of the comparator CP11 is L level, while the outputs of the comparators CP12 and CP13 are H level, and only the transistor P51 is controlled on, while the transistors P52 and P53 are controlled off. Herein, the control by the frequency divider and counter 71 enables the output current b to be of a value equivalent to the diffusion width (e.g., ±14%) defined by the transistors P31 to P35.

When Vref3<Vfb<Vref2, the outputs of the comparators CP11 and CP12 are L level, while the output of the comparator CP13 is H level, and the transistors P51 and P52 are controlled on, while the transistor P53 is controlled off. Herein, the control by the frequency divider and counter 71 enables the output current b to be of a value equivalent to the diffusion width (e.g., ±17.5%) defined by the transistors P31 to P36.

When Vfb<Vref3, the outputs of the comparators CP11 to CP13 are L level, and the transistors P51 to P53 are controlled on. Herein, the control by the frequency divider and counter 71 enables the output current b to be of a value equivalent to the diffusion width (e.g., ±21%) defined by the transistors P31 to P37.

Second Embodiment

Figure 5:
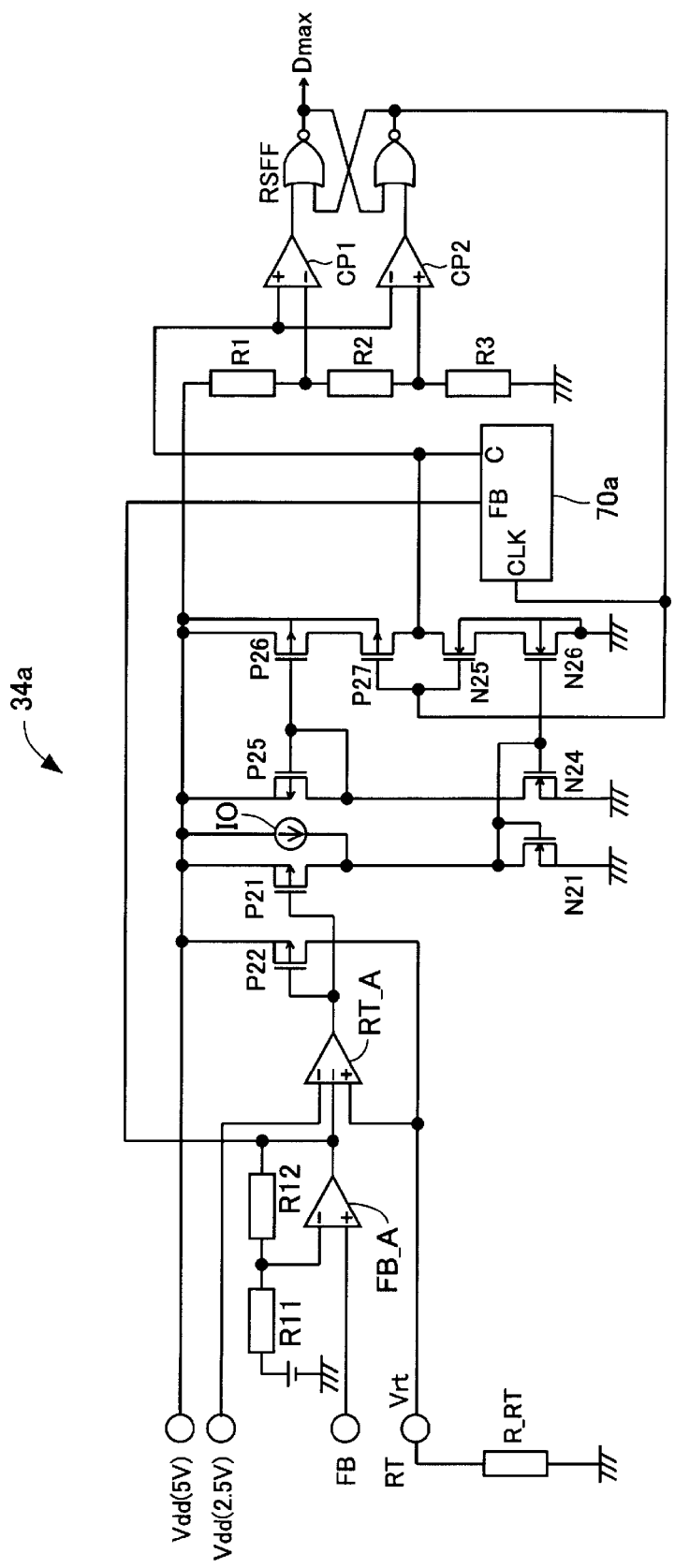
FIG. 5 is a diagram showing an outline configuration of an oscillator provided in a control IC of a switching power supply device according to a second embodiment.
Figure 6:
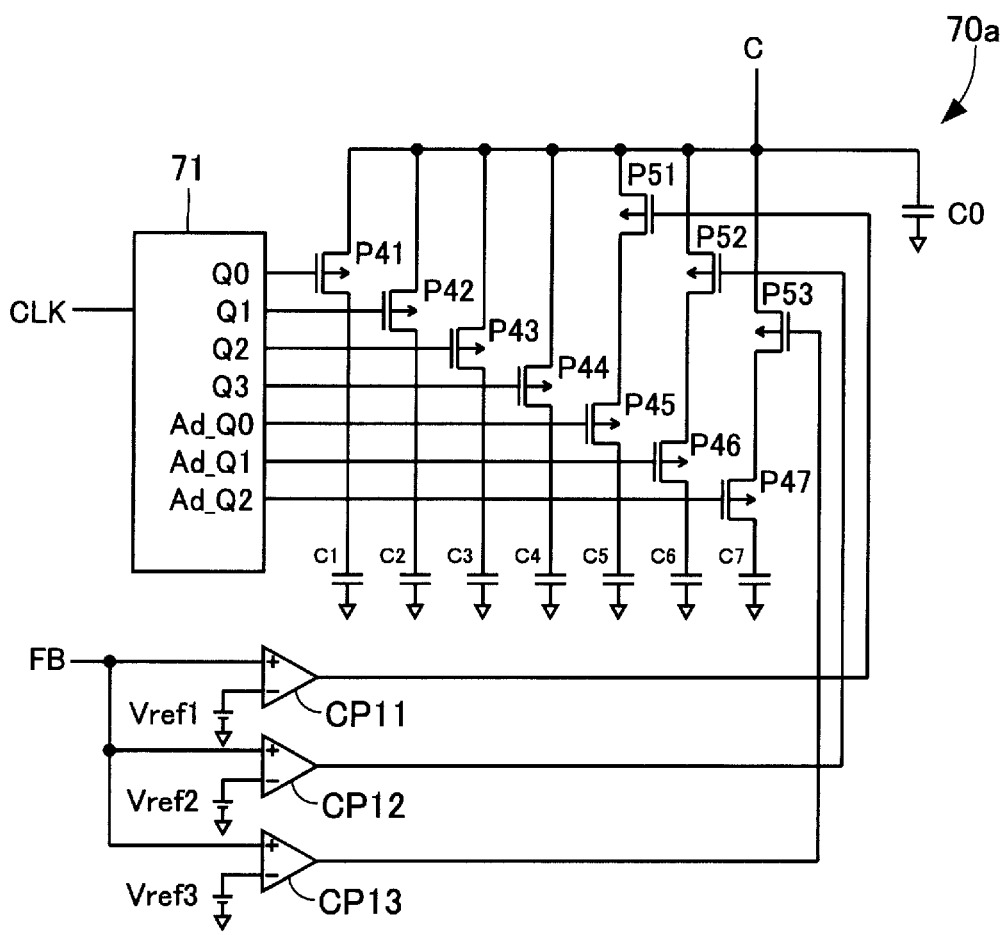
FIG. 6 is a diagram showing an outline configuration of a jitter control circuit provided in the oscillator of FIG. 5.

FIG. 5 is a diagram showing an outline configuration of an oscillator provided in a control IC of a switching power supply device according to a second embodiment, and FIG. 6 is a diagram showing an outline configuration of a jitter control circuit provided in the oscillator of FIG. 5. In FIGS. 5 and 6, components identical to or equal to the components shown in FIGS. 3 and 4 are given the same signs, thus omitting a detailed description.

In the first embodiment, a configuration is such that the current which charges the capacitor C is changed in response to the feedback voltage FB or the output of the amplifier FB_A which amplifies the feedback voltage FB, while in the second embodiment, a configuration is such that the capacitance of the capacitor C is changed in response to the feedback voltage FB or the output of the amplifier FB_A which amplifies the feedback voltage FB. FIG. 6 shows an example applying the feedback voltage FB.

Therefore, an oscillator 34a is such that a set of transistors P22 and P21, a set of transistors N21, N24, and N26, and a set of transistors P25 and P26 each configure a current mirror circuit. A common connection point of the transistors P27 and N25 connected between the transistors P26 and N26 is connected to a terminal C of a jitter control circuit 70a having a variable capacitance function.

The jitter control circuit 70a includes transistors P41 to P47, connected to outputs Q0 to Q3 and Ad_Q0 to Ad_Q2 of the frequency divider and count 71, and transistors P51 to P53 connected to the outputs of the comparators CP11 to CP13. The sources of the transistors P41 to P44 and P51 to P53 are connected to the common connection point of the transistors P27 and N25 via the terminal C. The drains of the transistors P41 to P47 are connected to ends of capacitors C1 to C7, respectively, and the other ends of the capacitors C1 to C7 are grounded. A capacitor C0 is connected to the terminal C. The capacitor C0 prevents oscillation from stopping due to no more charge or discharge of the capacitors C1 to C7 when all the outputs of the frequency divider and counter 71 become H level and all the capacitors C1 to C7 come off the terminal C. The capacitance values of the capacitors C1 to C7 are expressed by C1 to C7 as C1<C2< . . . <C6<C7.

The jitter control circuit 70a is such that in the fixed frequency region in which the switching frequency is set to the maximum oscillation frequency (e.g., 65 kHz) under constant load condition, the frequency divider and counter 71 selectively controls only the transistors P41 to P44 on/off. As a result of this, only the capacitors C0 and C1 to C4 are selectively used, and the charge and discharge of the selectively used capacitor are controlled.

As opposed to this, when the switching frequency is set to the frequency reduction region, in which the switching frequency is changing with a change in load, and to the minimum oscillation frequency (e.g., 25 kHz), the combination of the capacitors C0 and C1 to C7 is switched in response to the feedback voltage FB. By so doing, the capacitance between the terminal C and the ground is variably set, and a diffusion width corresponding to the feedback voltage FB is obtained.

Third Embodiment

Figure 7:
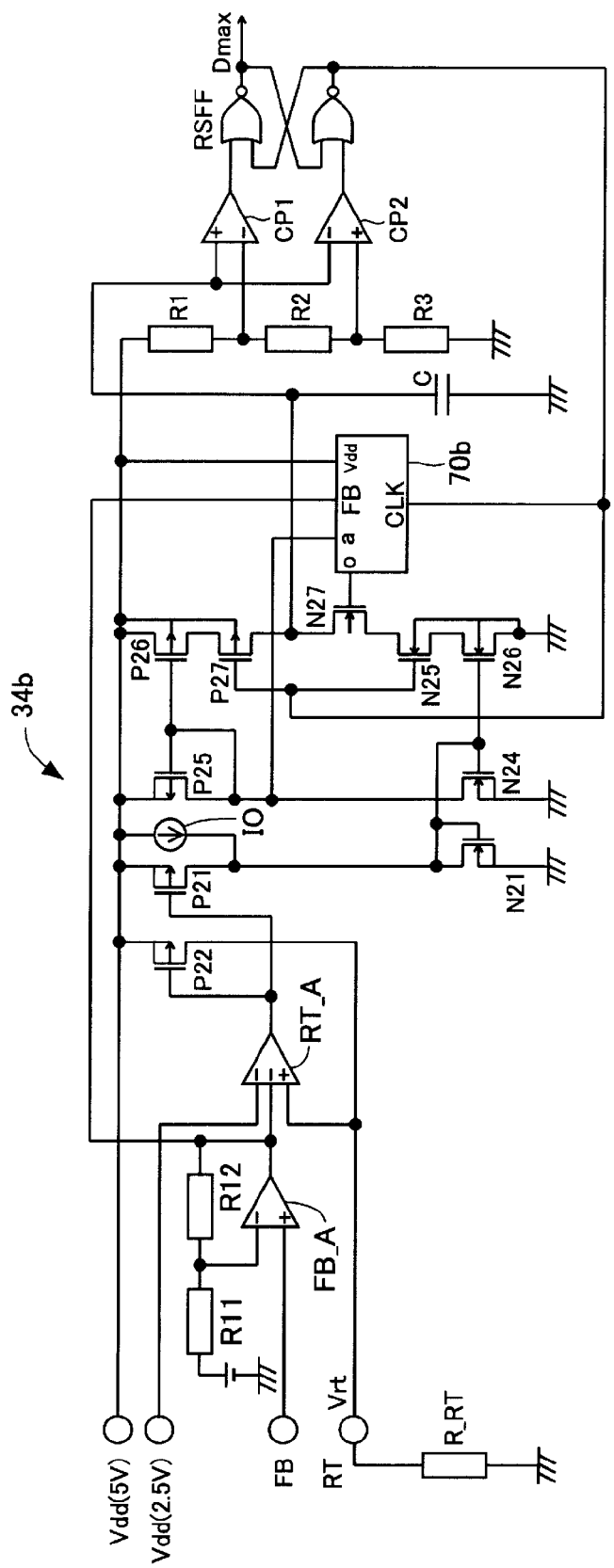
FIG. 7 is a diagram showing an outline configuration of an oscillator provided in a control IC of a switching power supply device according to a third embodiment.
Figure 8:
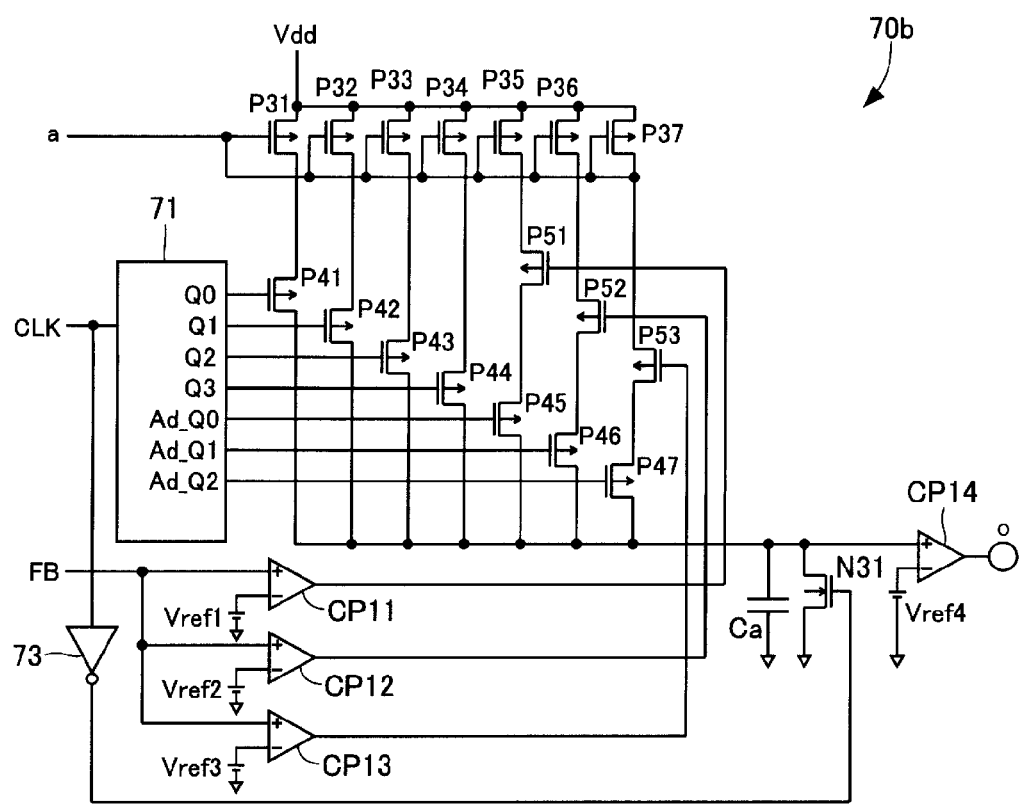
FIG. 8 is a diagram showing an outline configuration of a jitter control circuit provided in the oscillator of FIG. 7.

FIG. 7 is a diagram showing an outline configuration of an oscillator provided in a control IC of a switching power supply device according to a third embodiment, and FIG. 8 is a diagram showing an outline configuration of a jitter control circuit provided in the oscillator of FIG. 7. In FIGS. 7 and 8, components identical or equal to the components shown in FIGS. 3 and 4 are given the same signs, thus omitting a detailed description.

The oscillator 34b of the third embodiment includes a jitter control circuit 70b such as shown in FIG. 8, in place of the jitter control circuit 70 of the first embodiment which controls the output current b applied to the transistor N23. Furthermore, the oscillator 34b includes a discharge control transistor N27 interposed between the transistors P27 and N25. The configuration of each current mirror circuit in the portion other than the jitter control circuit is the same as in FIG. 5 according to the second embodiment.

The oscillator 34b basically charges and discharges the capacitor C with a current set in response to the feedback voltage FB, that is, a current set for the transistors P26 and N26. At this time, the transistor N27 controls the discharge of the capacitor C by being controlled on/off by an output signal o of the jitter control circuit 70b. In particular, the jitter control circuit 70b assumes the role of controlling the transistor N27 on/off and thereby variably setting a time needed from the charge of the capacitor being completed until the discharge is started.

That is, the jitter control circuit 70b includes an auxiliary capacitor Ca which is charged with an output current passing selectively through the transistors P41 to P47, as shown in FIG. 8, in addition to the configuration of the jitter control circuit 70 shown in FIG. 4. Furthermore, the jitter control circuit 70b includes an inverter 73, which logically inverts the output of the RS flip-flop RSFF (the clock signal CLK=the inverted signal of the oscillation signal Dmax), a transistor N31, which controls the discharge of the auxiliary capacitor Ca, and a comparator CP14. The comparator CP14 turns on the transistor N27 when the charge voltage of the auxiliary capacitor Ca exceeds a reference voltage Vref4.

The jitter control circuit 70b configured in this way controls the charge and discharge of the auxiliary capacitor Ca in synchronism with the clock signal CLK. That is, in a period in which the capacitor C is being charged and the clock signal CLK is L level, the transistor N31 turns on, thus discharging the auxiliary capacitor Ca, and when the charge of the capacitor C finishes and the clock signal CLK turns to H level, the transistor N31 turns off, and the charge of the auxiliary capacitor Ca is started.

When the charge voltage of the auxiliary capacitor Ca reaches the reference voltage Vref4, the comparator CP14 operates the transistor N27 on, thereby allowing the discharge of the capacitor C. In other words, the comparator CP14 keeps the transistor N27 in off-state, thus preventing the discharge of the capacitor C, in the period until the charge voltage of the auxiliary capacitor Ca reaches the reference voltage Vref4.

Consequently, the capacitor C is charged upon receiving the current from the transistor P26, and after the charge voltage of the capacitor C reaches the reference voltage, the capacitor C is discharged by the current, extracted by the transistor N26, after a lapse of the period in which the transistor N27 is kept in off-state. As a result of this, a stop period, in which the charge and discharge of the capacitor C is stopped, is variably set by the jitter control circuit 70b. The cycle of a pulse signal which drives the MOSFET 17 on/off is variably set by variably setting the stop period, thereby controlling the switching frequency.

Incidentally, when the switching frequency is set to the maximum oscillation frequency (e.g., 65 kHz), a current which charges the auxiliary capacitor Ca is selectively set in a small range. Consequently, a long time is needed to charge the auxiliary capacitor Ca, and the stop period is set to be long. Therefore, a switching amplitude for the switching frequency, being controlled by the current from the transistors P31 to P34, is set to be small.

As opposed to this, when the switching frequency is set to the frequency reduction region, in which the switching frequency is changing with a change in load, and to the minimum oscillation frequency (e.g., 25 kHz), the current which charges the auxiliary capacitor Ca is selectively expanded to a large range. Consequently, in this case, the minimum charge time of the auxiliary capacitor Ca is shortened, and as a result of this, a minimum stop period is set to be short. Further, the minimum charge and discharge cycle of the capacitor C is shortened, and the minimum cycle of the pulse signal which drives the MOSFET 17 on/off is shortened, by an amount in which the stop period is shortened. Therefore, the diffusion width for the switching frequency, being controlled by the current from the transistors P31 to P37, is set to be large. Consequently, the diffusion width of a jitter frequency with respect to the switching frequency is expanded in order in the frequency reduction region and the fixed frequency region of the minimum oscillation frequency.

Other Embodiments

Figure 9:
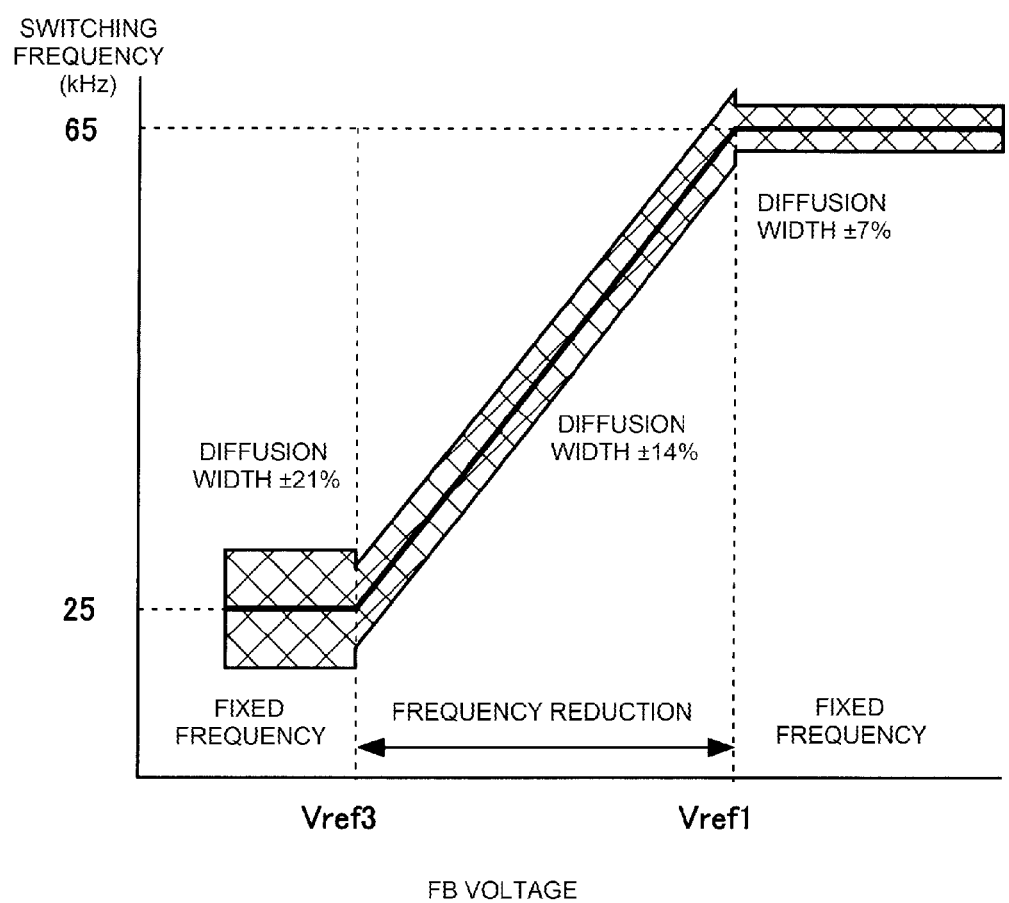
FIG. 9 is a diagram showing a concept of another jitter control of the invention.

FIG. 9 is a diagram showing a concept of another jitter control of the invention.

In the heretofore described jitter control shown in FIG. 1, switching of the diffusion width of the switching frequency is carried out in three stages, while in the jitter control shown in FIG. 9, the diffusion width of the switching frequency is switched in two stages.

According to this jitter control, in the fixed frequency region in which the switching frequency is set to the maximum oscillation frequency (e.g., 65 kHz), the diffusion width of the switching frequency is set at, e.g., ±7%. In the frequency reduction region, the diffusion width of the switching frequency is set at, e.g., ±14%, and in the fixed frequency region of the minimum oscillation frequency (e.g., 25 kHz), the diffusion width of the switching frequency is set at, e.g., ±21%.

In order to set the diffusion width of the switching frequency at the above kinds of values, a configuration only has to be such as to compare the feedback voltage FB with only the reference voltages Vref1 and Vref3 in the jitter control circuit 70, 70a, and 70b of the first to third embodiments. That is, a configuration only has to be such that the comparator CP12, the reference voltage Vref2 thereof, and the transistors P36, P46, and P52 relating to the operation of the comparator CP12 are omitted from the jitter control circuits 70 and 70b of the first and third embodiments, and that the gate of the transistor P47 is connected to Ad_Q1. Also, a configuration only has to be such that the comparator CP12, the reference voltage Vref2 thereof, and the transistors P46 and P52 and capacitor C6 relating to the operation of the comparator CP12 are omitted from the jitter control circuit 70a of the second embodiment, and the capacitance value of the capacitor C6 is made the same as that of the capacitor C7, and furthermore, that the gate of the transistor P47 is connected to Ad_Q1.

In the heretofore described embodiments, a description is given, as an example, of a flyback type switching power supply device with a commercial alternating current power source as an input, but the invention not being limited to this type of switching power supply device, the input may be a direct current power source such as a battery, and it goes without saying that the invention can also be applied to a switching power supply device using single inductance rather than a transformer.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A switching power supply device control circuit which, when controlling so as to generate a predetermined direct current voltage by switching a switching element connected to an input voltage and output the direct current voltage to a load, controls so as to reduce a switching frequency as the load shifts from a heavy load to a light load, the switching power supply device control circuit comprising:
an oscillator which determines the switching frequency corresponding to a condition of the load by switching a predetermined current corresponding to the condition of the load between charging and discharging a capacitor; and
a jitter controller, provided in the oscillator, which gives frequency diffusion to the switching frequency, wherein
the jitter controller controls so as to expand a diffusion width of the switching frequency as the load shifts from a heavy load to a light load.

2. The switching power supply device control circuit according to claim 1, wherein
the jitter controller expands the diffusion width of the switching frequency by increasing a region of a change in the current, which charges the capacitor, as the load shifts from a heavy load to a light load.

3. The switching power supply device control circuit according to claim 2, wherein
the jitter controller detects in stages the shift of the load from a heavy load to a light load using a plurality of comparators which compare reference voltages different in values from one another with a feedback voltage representing the condition of the load.

4. The switching power supply device control circuit according to claim 1, wherein
the jitter controller expands the diffusion width of the switching frequency by increasing a region of a change in a capacitance of the capacitor as the load shifts from a heavy load to a light load.

5. The switching power supply device control circuit according to claim 4, wherein
the jitter controller detects in stages the shift of the load from a heavy load to a light load using a plurality of comparators which compare reference voltages different in values from one another with a feedback voltage representing the condition of the load.

6. The switching power supply device control circuit according to claim 1, wherein
the jitter controller variably sets so as to increase a region of a change in a time, needed from when a charge of the capacitor is completed until discharge starts, as the load shifts from a heavy load to a light load.

7. The switching power supply device control circuit according to claim 6, wherein
the jitter controller detects in stages the shift of the load from a heavy load to a light load using a plurality of comparators which compare reference voltages different in values from one another with a feedback voltage representing the condition of the load.

8. An apparatus, comprising:
a frequency determining device configured to determine a switching frequency of a power supply in response to a load; and
a frequency diffusion device configured to diffuse the switching frequency within a plurality of diffusion ranges as the switching frequency changes in response to operation of the frequency determining device;
wherein a width of each of the plurality of diffusion ranges increases as the switching frequency becomes lower.

9. The apparatus of claim 8, wherein the frequency diffusion device is configured to change a diffusion range from one of the plurality of diffusion ranges to another of the plurality of diffusion ranges based at least partly on a feedback signal corresponding to the load.

10. The apparatus of claim 9, wherein the frequency diffusion frequency device is configured to perform a comparison of the feedback signal with one of a plurality of reference signals, and change the diffusion range from the one of the plurality of diffusion ranges to the other of the plurality of diffusion ranges based at least partly on a result of the comparison.

11. The apparatus of claim 8, wherein the plurality of diffusion ranges include a narrowest diffusion range corresponding to a highest fixed switching frequency of the power supply, a widest diffusion range corresponding to a lowest fixed switching frequency of the power supply, and at least one transitional diffusion range between the narrowest diffusion range and the widest diffusion range, the at least one transitional diffusion range corresponding to a transitional switching frequency of the power supply between the highest fixed switching frequency of the power supply and the lowest fixed switching frequency of the power supply.

12. The apparatus of claim 8, wherein the frequency diffusion device comprises a plurality of transistors configured to define the width of each of the plurality of diffusion ranges.

13. A switching power supply device, comprising:
a control circuit which, when controlling so as to generate a predetermined direct current voltage by switching a switching element connected to an input voltage and output the direct current voltage to a load, controls so as to reduce a switching frequency as the load shifts from a heavy load to a light load, wherein
the control circuit includes:
an oscillator which determines the switching frequency corresponding to a condition of the load by switching a predetermined current corresponding to the condition of the load between charging and discharging a capacitor; and
a jitter controller, provided in the oscillator, which gives frequency diffusion to the switching frequency, wherein
the jitter controller controls so as to expand a diffusion width of the switching frequency as the load shifts from a heavy load to a light load.

* * * * *